July 8, 1947.  B. C. FLITTON  2,423,764

AIR NAVIGATION COMPUTOR

Filed Dec. 12, 1945  2 Sheets-Sheet 1

INVENTOR
BRUCE C. FLITTON
BY
Harry Lea Dodson.
ATTORNEY

July 8, 1947.　　　　B. C. FLITTON　　　　2,423,764
AIR NAVIGATION COMPUTOR
Filed Dec. 12, 1945　　　　2 Sheets—Sheet 2

INVENTOR
BRUCE C. FLITTON
BY
Harry Lea Dodson.
ATTORNEY

Patented July 8, 1947

2,423,764

UNITED STATES PATENT OFFICE 2,423,764

AIR NAVIGATION COMPUTER

Bruce C. Flitton, Long Beach, Calif.

Application December 12, 1945, Serial No. 634,598

6 Claims. (Cl. 235—78)

My invention relates to that class of devices which are designed to assist a pilot in orienting an airplane.

The primary design of my invention is to enable a pilot to orient his airplane when either a particular radio range is inoperative ("out") or the command set is "out" or both conditions occur simultaneously.

The principal object of my invention is to provide a convenient, quickly adjusted and certain means by which a pilot can ascertain the time, distance and direction to his desired point when the above conditions pertain.

A further object of my invention is to provide a quick and certain means for enabling a pilot to determine what magnetic heading he must fly to arrive over his desired point when the above conditions prevail. It is well known among pilots, and those familiar with the art of flying instruments that the command set or radio range sometimes becomes inoperative. This may be due to the weather conditions, mountainous conditions, mechanical failures, or sometimes conditions the cause of which is unknown. When this occurs it becomes necessary for the pilot, in order to make a safe flight or let-down, to employ the loop or radio compass method of orientation for his let-down. This is done by tuning in on a commercial broadcasting station by adjusting the loop and flying with the radio compass and loop. In this manner the pilot is able to achieve a safe flight and letdown, even at night or when weather conditions are such that instrument orientation is required.

The procedure for obtaining this result is well known to all instrument pilots. For example, if a pilot is flying from Texas to Los Angeles and upon reaching the vicinity of his destination, the pilot discovers the home range is inoperative and instrument weather exists, the pilot will make use of the facility chart or sectional map and locate a commercial radio broadcasting station, near the airport where he intends to land. He then ascertains from the sectional map that the heading from this station to the airport is 300°, and that the airport is twelve miles from the station.

Thus the known factors in this example are the location of the point (airport at home), the location of the broadcasting station, the miles apart and the compass heading between the two.

As is commonly known, the pilot must now ascertain the time to the station, his distance therefrom and the direction he must fly to intersect at right angles the predetermined heading (the compass heading between the broadcasting station and the airport).

There are formulae which the pilot uses taking advantage of the close similarity between the radian degrees which actually is 57+° and the factor 60. This factor works very satisfactorily for small angles and especially so because time is also measured by 60 as a factor. Thus the minutes to the station is obtained by the formula:

$$M = \frac{60 \times \text{minutes between bearings}}{\text{Degrees of bearing change}}$$

and the "distance to the station" is obtained by the formula:

$$D = \frac{\text{True air speed} \times \text{minutes flown}}{\text{Degrees of bearing change}}$$

The first step for the pilot is to determine his Q. D. M. (quadrant direction magnetic). This is the magnetic heading between the plane and the station at the beginning of the problem. With this knowledge, the pilot then determines the quadrant (quarter of the compass) he is in with relation to the station. Then this knowledge enables him to proceed with his calculations as will be disclosed. It will now be described how the Q. D. M. was obtained prior to the introduction of my invention. In order to obtain the Q. D. M., the pilot takes the magnetic heading, he is then flying, turns on his radio compass, notes the radio compass heading and adds the magnetic compass heading. If the result is more than 360° he subtracts 360° and this is the Q. D. M. Thus if in our example the plane were traveling on a magnetic heading of 240° and his radio compass heading to the station were 300°, adding the two together would equal 540°, and subtracting 360° therefrom, a direction called the Q. D. M. of 180° is obtained. If the Q. D. M. is less than the predetermined heading the pilot subtracts 90° from the predetermined heading, if the Q. D. M. is greater than the predetermined heading, the pilot adds 90° to it.

In the instant case, the Q. D. M. is less than the predetermined heading and therefore the pilot must subtract 90° from the predetermined heading or 210°. This is the magnetic heading the pilot must fly to intersect the predetermined heading at right angles. The quadrant the pilot is in with relation to the station must now be ascertained. Now, from the Q. D. M., 180° is subtracted. In the present case the result is 0° and therefore the plane is north of the station, and in a north quadrant.

The next step is for the pilot to ascertain the number of minutes he is away from the station. Keeping his radio compass tuned to the station, the pilot turns the airplane until the azimuth needle is 90° or 270°. Noting the time the pilot flies in this direction until a 10° change of needle is observed, and then again notes the time. Employing the formula above, the minutes from the station is obtained. To obtain the distance from the station the formula referred to above may be employed since all of the data is at hand. Turning to 210°, magnetic heading, the pilot now flies until his radio compass above shows he has intersected the predetermined heading at right angles (wing-tip null) and making a normal turn of 3° per second, the pilot attains a nose null position and passes over the station, after which he employs the customary let-down procedures.

It is a well known fact that a pilot who is engaged in flying instruments is kept extremely busy both mentally and physically. For this reason any means of facilitating his arrival at the correct figures and orientation of the problems presented, other than the pilot's mental calculation, would be of great help besides eliminating the human equation with the possibility of resultant errors.

My means of accomplishing the foregoing objects may be more fully comprehended by having reference to the accompanying drawings which are hereunto annexed and are a part of this specification in which.

Similar reference numerals refer to similar parts throughout the specification.

Figure 1:
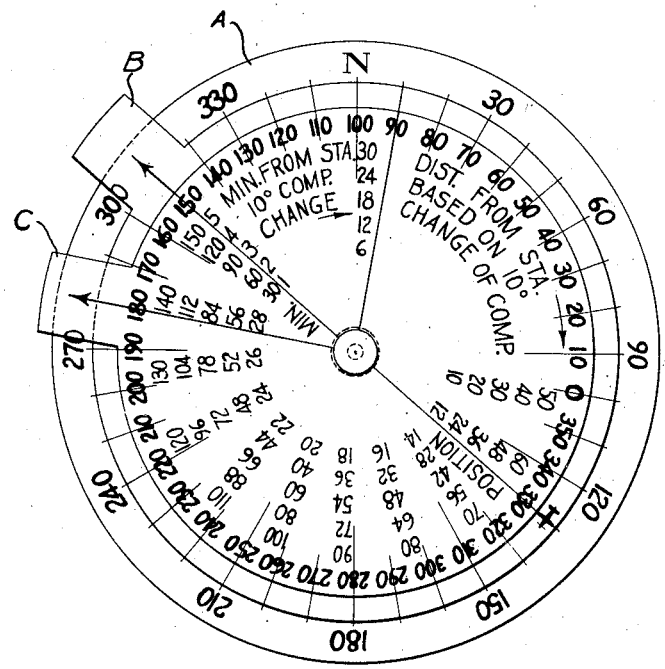
Fig. 1 is a top or plan view of my complete computer.
Figure 2:
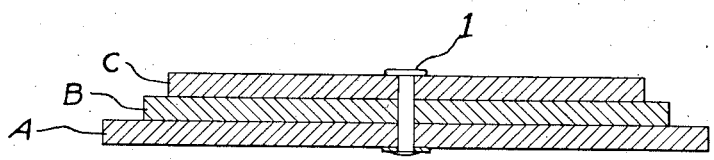
Fig. 2 is a cross section of the same.
Figure 3:
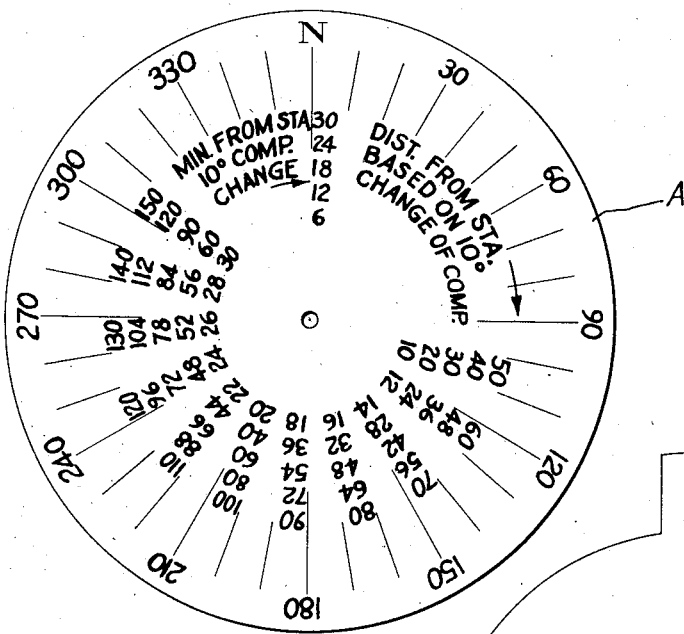
Fig. 3 is a top or plan view of the bottom disc.
Figure 4:
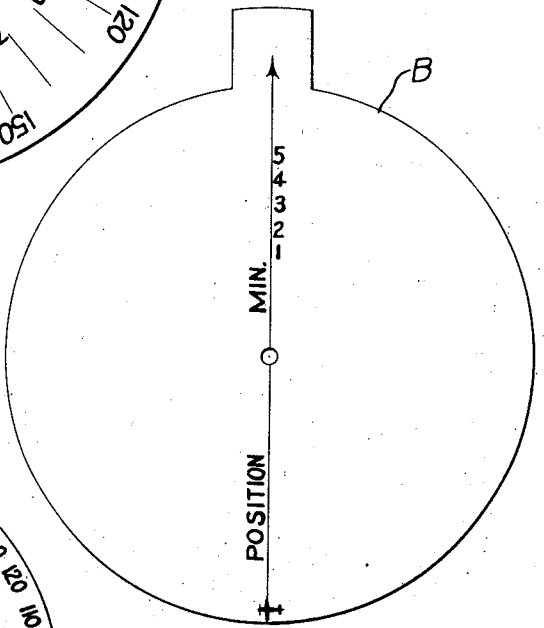
Fig. 4 is a top or plan view of the intermediate disc.
Figure 5:
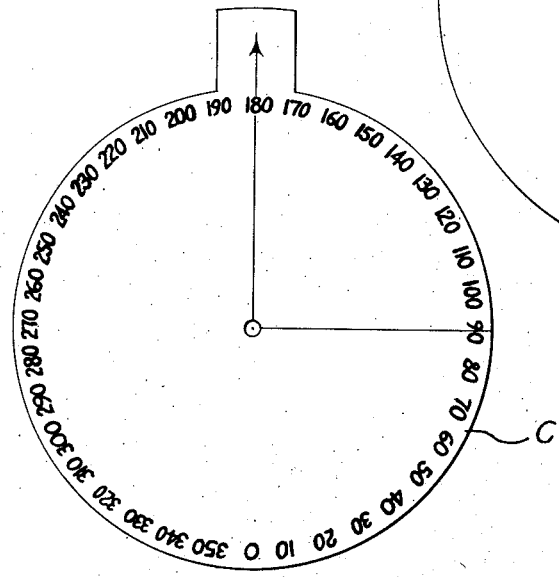
Fig. 5 is a top or plan view of the top disc.

As shown in the drawings the device comprises a plurality of discs, three in number, designated A, B, and C, respectively, two of which are superimposed upon the last one. The three discs A, B, and C, are rotatably mounted upon a central bearing 1, for manual rotation. The lower or bottom disc A is divided at its periphery into 36 equal segments bearing numerals designating the various degrees of the campass, so that it is similar to a compass rose, or these numerals may signify miles per hour.

The letter "N" occupying the position for 360° is scribed or printed on the lower disc A. Beginning at and adjacent to the 100° segment and at intervals of 20° are a plurality of numerals arranged in concentric arcs, the inner arc progressively increasing by two and increasing radially by the addition of the numerals on the inner arc. That is to say, for example, the numerals adjacent the 100° segment start with the numeral 10, increasing radially by the addition of 10, so that they are 10, 20, 30, 40, 50, respectively. These numbers designate the distance from the station. At the next numeral on the inner arc the radial number starts with 12 and increases by that number radially, being 24, 36, 48, 60, the same arrangement continues up to the 300° segment. These numerals on the inner arc it will be thus seen correspond to the degrees on the compass rose A minus the cipher.

Intermediate the numerals and adjacent to the 300° on the bottom disc A, I print or scribe abbreviations of the words "minutes" and "station," thus "Min. from Sta." Then on the next inner concentric arc "10 compass" and below it the word "Change" with an arrow pointing to the radial numerals adjacent "N." Adjacent the line at "N." are numerals starting with 6 on the inner arc and increasing progressively by that numeral up to 30. Adjacent these numerals and between them and the numerals adjacent 100° on the compass rose A are scribed or printed the words "Dist. from Sta. based on 10 change of compass."

The intermediate disc B is provided with a line, bi-secting it, which has the representation of a plane at one end of the line, and the word "Position" adjacent said end. On the opposite end of this line is an arrow head and a plurality of radial arranged numerals 1, 2, 3, 4, 5. Adjacent this line is an abbreviation of the word minutes thus "Min." This disc B is provided with an outwardly extending lug for convenient manual rotation about the centering means.

The top disc C is divided adjacent its periphery into a compass rose, bearing the numerals from 0 to 360 arranged consecutively about its periphery. This disc C has a line which extends from its center outwardly and terminates in an arrow head. A second line, at right angle, to the first, extends outwardly to the 90° segment.

I have found it desirable to make the indicia on the various discs of contrasting color. For example, I employ, black letters on disc A—blue letters and arrow on disc B, and red letters and arrow on disc C, and in my description of the operation I shall employ these colors, although it will be obvious to persons skilled in the art that the particular colors employed are not part of my invention it merely being for the convenience of the pilot and any desired contrasting colors may be employed.

The operation of the device is as follows:

The pilot desiring to find his quadrant direction magnetic or bearing to the station will place the blue arrow on disc B at the degree corresponding to his magnetic heading on the outer compass rose on the bottom disc A. He will then rotate the disc C on top of the blue arrow on disc B to the degree corresponding to his radio azimuth. The Q. D. M. will then be found on disc C under "N." of the outer compass rose on disc A.

The pilot will then need to find his quadrant direction magnetic reciprocal to find the quadrant he is in with respect to the station.

To do this he will rotate the intermediate disc B until the blue arrow will be over the quadrant direction magnetic on the outer compass rose of bottom disc A. The reciprocal of the quadrant direction magnetic will be found at the opposite end of the blue arrow on the intermediate disc B, on the compass rose the bottom disc A which indicates the quadrant position.

It will then be necessary to find the heading that the pilot must fly in order to intersect the predetermined heading at right angles.

He will first place the red arrow on the top disc C over the predetermined heading on the outer compass rose on disc A. The heading the pilot must fly to intersect the predetermined heading at right angles will be found on the outer compass rose on the bottom disc A opposite 90° on the compass rose on the top disc C. The pilot will then desire to know the time from the broadcasting station, which he is employing for the purpose of orientating himself. He does this by placing the blue arrow on intermediate disc B in registration with N of the compass rose on the bottom disc A. He can then read the number of minutes from the station on disc A opposite the number of minutes on disc B for 10 degrees change of compass.

In order for him to determine the distance from the broadcasting station, he will place the blue arrow on disc B opposite the number of the number corresponding to the speed of the airplane on the compass rose on the bottom disc A. The distance from the station will then be found on the bottom disc A opposite the number of minutes on disc B.

It will be clear to pilots and persons familiar with the flying art that the device provides a quick and easy means for computing the various factors necessary for the pilot to determine in order to have a safe flight when flying on instruments and entirely eliminates any necessity for mental calculation upon the part of the pilot, and thus lessens the dangers of errors thereby increasing the safety of the pilot and his ship.

Having described my invention, what I regard as new and desire to secure by Letters Patent is:

1. In a device to aid a pilot in orienting his plane on instrument flight when either the command set is inoperative or the radio range is inoperative or both are inoperative, three manually rotatable discs comprising top, intermediate and bottom, one of said rotatable discs bearing a compass rose adjacent its periphery, another of said rotatable discs bearing a radially directed bisecting line, the third of said rotatable discs bearing a compass rose adjacent its periphery, and indicia on the ends of said bisecting line whereby by placing the bisecting line on the pilot's magnetic heading on one compass rose and his radio compass bearing on the second rose on the bisecting line, the quadrant direction magnetic may be obtained by reading the value on the second rose opposite the N of the front rose and the quadrant direction magnetic reciprocal may be obtained by shifting the bisecting line to overlap the quadrant direction magnetic reading on the first rose and reading the quadrant direction magnetic reciprocal on the first rose at the other end of the line.

2. In a device to aid a pilot in orienting his plane on instrument flight when either the command set is inoperative or the radio range is inoperative or both are inoperative, three rotatable discs comprising top, intermediate and bottom, the top disc having a compass rose adjacent its periphery, and a radial line which extends through the 180° scribed thereon, and a second radial line at right angles to said first radial line extending through the 90° scribed on said top disc, the intermediate disc having a bisecting line with indices at the ends of the line, the bottom disc having a compass rose adjacent its periphery and additional indicia thereon whereby a pilot can by the relative position of the top, intermediate and bottom rotatable discs determine the magnetic heading to intersect at right angles a predetermined heading.

3. In a device to aid a pilot in orienting his plane on instrument flight when either the command set is inoperative, or the radio range is inoperative, or both are inoperative, three rotatable discs comprising top, intermediate and bottom, the top disc having a compass rose adjacent its periphery, the intermediate disc having a bisecting line with a time scale thereon, the bottom disc having a compass rose adjacent its periphery, a time scale radially arranged on said disc whereby a pilot can by the relative position of the intermediate and bottom rotatable disc determine the time from a radio signal emitting station.

4. In a device to aid a pilot in orienting his plane on instrument flight when either the command set is inoperative or the radio range is inoperative, or both are inoperative, three rotatable discs comprising top, intermediate and bottom, the top disc having a compass rose adjacent its periphery, the intermediate disc having a bisecting line with a time scale thereon, the bottom disc having a compass rose adjacent its periphery a distance scale radially arranged on said disc whereby a pilot can by the relative position of the intermediate and bottom rotatable discs determine the distance from a radio signal emitting station.

5. In a device to aid a pilot in orienting his plane on instrument flight when either the command set is inoperative or the ratio range is inoperative, or both are inoperative, three rotatable discs comprising top, intermediate and bottom, each bearing indicia in contrasting colors, the top disc having a compass rose adjacent its periphery and a radial line which extends through the 180° scribed thereon with terminating indicia at the end thereof, and a second radial line at right angles to the first extending through the 90° scribed on said top disc, the intermediate disc having a bisecting line with terminating indicia at one end thereof with scaled time indicia arranged between the center of said bisecting line and said termination, and a position index adjacent the other end of the line, and additional position indicia scribed adjacent said other end of said line, the bottom disc having a compass rose adjacent its periphery with distance indicia arranged in scale scribed thereon in a clockwise direction from the north of said compass rose, and additional time indicia in arithmetical progression scale scribed thereon from the center thereof toward the north position of said compass rose whereby a pilot may by the relative settings of the three discs determine the quadrant direction magnetic reciprocal and the distance and time from a station, and the magnetic compass heading to be flown to intersect a predetermined heading.

6. A device to aid a pilot on an instrument flight comprising a lower disc having indicia thereon, centering means on said disc, two discs superimposed on said lower disc, and rotatably mounted on said centering means for manual rotation thereon, the lower disc being divided at its periphery into equal segments each bearing numerals of degrees and the letter "N" for the numeral 360, the segments from 100° to 300° bearing a plurality of numbers arranged in concentric arcs, said numerals progressively increasing radially in multiples representing minutes from the station with 10° compass change and a plurality of radially arranged numerals adjacent the "N" segment increasing by multiples of 6, the intermediate disc bearing a line dividing it into two equal halves and bearing adjacent one end of said line the representation of a plane and the word "Position," and adjacent the other end the word "Minutes" with a series of numerals in juxtaposition to said word, the top disc being divided into equal segments each bearing numerals of degrees and radial lines which extend from the center to 90° and 180° respectively, said discs being in arrangements whereby a pilot may compute his problem of time, distance, speed and heading of intersections.

BRUCE C. FLITTON.

REFERENCES CITED

The following references are of record in the file of this patent:

UNITED STATES PATENTS

| Number | Name | Date |
|---|---|---|
| 2,329,274 | Lamoreaux | Sept. 14, 1943 |
| 2,394,226 | Boldocchi | Feb. 5, 1946 |
| 2,405,113 | Clemons et al. | Aug. 6, 1946 |